United States Patent [19]
Bährle et al.

[11] 3,862,588
[45] Jan. 28, 1975

[54] METHOD OF OPERATING AN AXIAL PISTON MACHINE HAVING A HYDROSTATIC BEARING LOAD RELIEF DEVICE

[75] Inventors: Willy Bährle, Neu-Ulm/Donau; Dieter Weigle, Ulm/Donau, both of Germany

[73] Assignee: The Firm of Constantin Rauch, Ulm/Donau, Germany

[22] Filed: Dec. 17, 1973

[21] Appl. No.: 425,455

Related U.S. Application Data

[63] Continuation-in-part of Ser. No. 243,798, April 13, 1972, abandoned, which is a continuation of Ser. No. 56,864, July 21, 1970, abandoned.

[30] Foreign Application Priority Data

July 31, 1969 Germany.......................... 1939084

[52] U.S. Cl. ................................................. 91/486
[51] Int. Cl. .......................................... F01b 13/04
[58] Field of Search ........................... 91/486–489, 91/499

[56] References Cited
UNITED STATES PATENTS

| | | | |
|---|---|---|---|
| 2,525,979 | 10/1950 | Vickers | 91/499 |
| 3,635,126 | 1/1972 | Engel | 91/486 |
| 3,789,740 | 2/1974 | Boyer | 91/486 |

Primary Examiner—William L. Freeh
Attorney, Agent, or Firm—Edwin E. Greigg

[57] ABSTRACT

In an axial piston machine having a combination radial thrust bearing, the axial loading thereon from the axial pistons is counteracted by a self-aligning piston subjected to the output pressure of the machine and having a lubricating pressure pocket on its surface communicating with a bore penetrating the piston. The pressure exerted by the self-aligning piston of the bearing is so designed that the angle of the resultant force acting on the bearing is substantially equal to the structurally given optimal pressure cone angle of the bearing.

2 Claims, 5 Drawing Figures

METHOD OF OPERATING AN AXIAL PISTON MACHINE HAVING A HYDROSTATIC BEARING LOAD RELIEF DEVICE

CROSS REFERENCE TO RELATED APPLICATIONS

The present application is a continuation-in-part of application Ser. No. 243,798, filed on Apr. 13, 1972, now abandoned; which, in turn, is a continuation of application Ser. No. 56,864, filed July 21, 1970, and also now abandoned.

BACKGROUND OF THE INVENTION

1. FIELD OF THE INVENTION

The invention relates to a device for hydrostatic load relief of a bearing supporting the driving member, e.g., driving shaft or driving plate, of a hydrostatic axial piston machine (pump/motor), the supporting bearing being of the combination radial thrust type and the axial piston forces being counteracted by a hydrostatic counterbearing.

2. DISCUSSION OF THE PRIOR ART

It is known to compensate the axial forces on the driving plate of an axial piston machine generated by the pistons of the pump system by arranging on the other side of the driving plate a pressure piston system acting in opposition to the pump system. This pressure piston system is of similar construction to the pump system and comprises a symmetrically arranged second control or driving plate for suppllying oil under pressure to the system, the latter rotating in synchronism with the pump pistons. This apparatus requires the same complicated construction and has the same disadvantages, e.g., considerable leakage, as a twin machine, without providing the advantages of the latter, e.g., doubled output and increased versatility. In addition, although the axial forces are compensated, no provision is made for dealing with radial forces resulting from tilting and bending moments.

It is also known to compensate axial forces by means of a pressure-applying element, which acts on the driving plate similarly to a second control plate, and is provided with two kidney-shaped pressure pockets, either one of which is subjected to high pressure at a given moment. Pressure means supplied with pressure fluid through the pivot balls of the axial piston machine press the element against the driving plate. The tilting moment acting on the driving plate is compensated owing to the fact that the center of the opposing forces is on the axis of the resultant of the piston forces. This also is a complicated construction (pressure-applying element, many small pressure pistons, pressure fluid supply) and is liable to faults. Also, there is considerable leakage, since the kidney-shaped pressure pockets, which have to be sealed, are relatively large and one of them is always under high pressure.

It is necessary for obtaining long life and wear resistance in axial piston machines to place the point of application of the piston forces if possible within or in close vicinity of the supporting area of the driving shaft or driving plate bearing system. Therefore, in accordance with recently adopted practice, at least one of the bearings of the arrangement is a combination radial thrust bearing, i.e., a rolling contact type bearing capable of taking up an oblique load. With this arrangement, it is not possible to eliminate axial forces so as to achieve maximum working life for the bearings.

Two patented devices exemplary of the prior art are those disclosed in U.S. Pat. No. 2,525,979, issued on Oct. 17, 1950 to H. F. Vickers and in U.S. Pat. No. 3,635,126, issued on Jan. 18, 1972 to W. K. Engel et al.

U.S. Pat. No. 2,525,979 discloses a pump/motor device including two radial bearings and a separate hydraulic thrust support bearing, although it is stated that a radial thrust bearing can be used in combination with the hydraulic thrust bearing. There is no disclosure, however, of ensuring that the radial thrust bearing should be loaded at most at the design pressure cone angle of that bearing.

U.S Pat. No. 3,635,126 discloses a pump/motor device including two radial thrust bearings and a separate hydrostatic bearing formed by a plurality of "buttons." Here too, there is no disclosure relating to the loading of the radial thrust bearings being at most at the design pressure cone angle of either of these bearings.

OBJECTS AND SUMMARY OF THE INVENTION

It is an object of the present invention to relieve the bearings supporting the driving shaft or driving plate of piston forces, in order to prolong the working life or reduce the overall dimensions of the machine.

It is another object of the present invention to ensure that the combination radial thrust bearing is loaded within or at most at its designed pressure cone angle.

These and other objects are achieved according to the present invention by means of a counterbearing in the form of a pressure piston which is disposed eccentrically to the axis of the driving member so as to produce an axial pressure force in a plane defined by the axial component of the resultant of the piston forces and by the axis so as to compensate the bending moments exerted by the axial component of the resultant of the piston forces on the driving member, the pressure force being proportioned relative to the axial component of the resultant of the piston forces so as to cause the resultant of the combined axial forces and the radial component of the resultant of the piston forces to load the combination radial thrust bearing at an angle which is approximately equal to but at most as large as the pressure cone angle determined by the construction of the radial thrust bearing. The invention proper resides in a method of operating the axial piston machine, according to which the magnitude of the axially parallel forces exerted by the pressure piston on the bearing is set to such a value that the aforenoted angle of the resultant force that loads the combination radial thrust bearing is achieved.

The invention makes it possible to load the rolling contact type bearing so as to make it operate with minimum rolling friction coefficient and achieve maximum working life.

In an embodiment of the invention, the pressure piston is self-aligningly guided so as to be movable about its axis in a cylinder bore, which is connected to the pressure side of the axial piston machine. The pressure piston may have on its active surface one or more pressure pockets connected by way of borings with the cylinder bore.

DESCRIPTION OF THE EMBODIMENT

Figure 1:
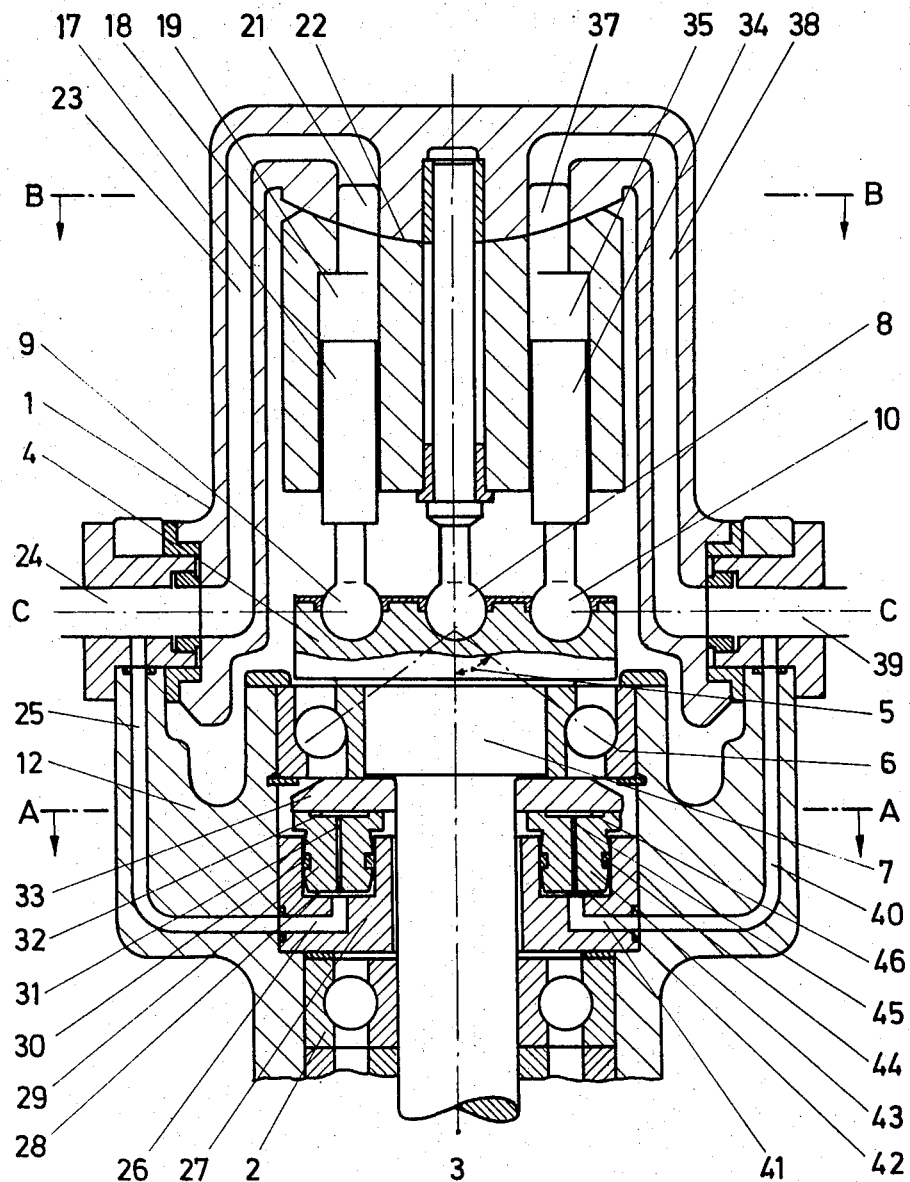
FIG. 1 is a longitudinal sectional view through an axial piston machine according to the invention.
Figure 3:
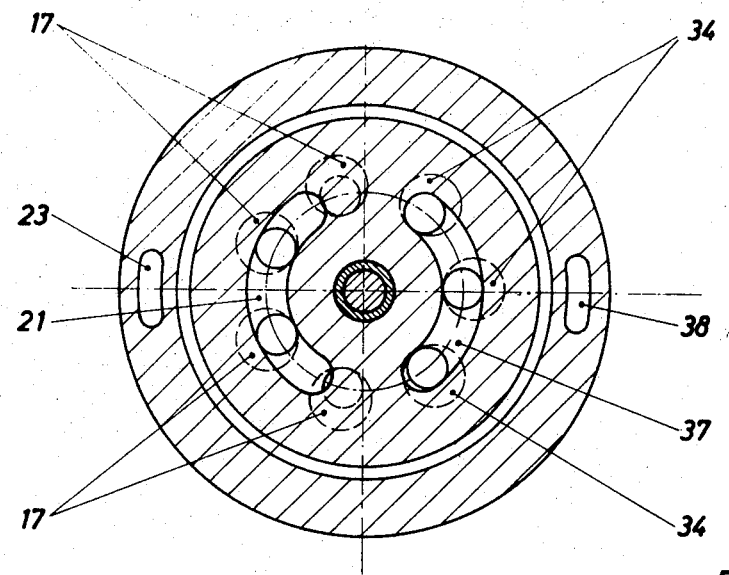
FIG. 3 is a cross section on the plane B—B of FIG. 1.

The adjustable axial piston machine 1 shown in the drawings is driven via a driving shaft 7 by a motor (not shown). A driving plate 4 rotates piston rods 9, 10, pistons 17, 24 and a cylinder 18, which is mounted on a central stud 8, relative to a control surface 22. The cylinder 18 with its associated structure is swingable about axis C—C to cause the driving plate 4 to assume different angular positions relative to the axis of the cylinder 18. During one revolution of cylinder 18, each piston 17, 34 moves upwards and downwards once in its cylinder bore 19, 35. When, for example, piston 34 is at the suction side of the machine, it draws in hydraulic fluid through a kidney-shaped suction port 37 and bores 38, 39 and delivers it under pressure at the opposite side through a kidney-shaped pressure port 21 and bores 23, 24 to a consumer (not shown). As a rule, there is more than one piston at the pressure side as well as at the suction side.

On the other hand, pistons 17 are under pressure and act by way of associated piston rods 9 on driving plate 4, the resultant of these forces placing an eccentric load on driving plate 4 or driving shaft 7. The latter is mounted in a combination radial thrust bearing 6, i.e., an obliquely loadable rolling contact bearing, and in a radial bearing 2.

Figure 4:
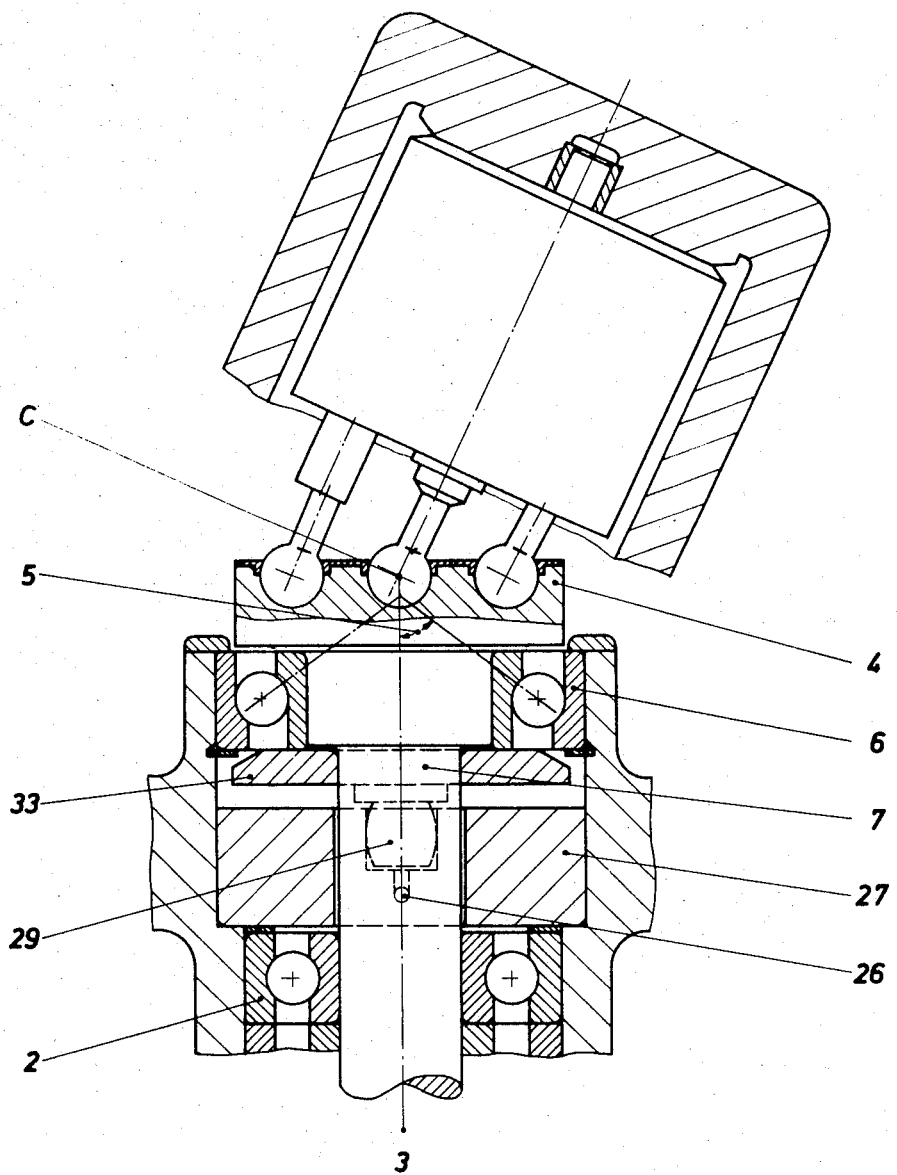
FIG. 4 is a sectional view perpendicular to that of FIG. 1.

Bearing 6, as shown in the drawing, is what is known in the United States as a combined axial and radial thrust angular contact type single row ball bearing. When a thrust load is applied, the inner ring is displaced which causes the balls to contact the inner and outer raceways at points along a line having an angle with respect to a line perpendicular to the axis. This angle is known as the contact angle and is designed into the bearing at the time of manufacture. It is considered the operating angle of the bearing. See "Anti-Friction Bearings", by Hudson T. Morton, 2nd Edition, 1965, published by Hudson T. Morton at Ann Arbor, Mich.; copy in the Scientific Library of the Patent Office; pages 31, 252H, 252 and 230 are of particular interest. Page 230 shows the intersecting chain dotted line passing through the bearing as seen in FIGS. 1 and 4. The contact angle indicated in the book is obviously the complement of angle 5 which is called the pressure cone angle by applicant and is discussed later in the specification.

The eccentrically acting axial component of the resultant of the piston forces loads bearing 6 in the axial direction and, on the other hand, exerts a bending moment on driving plate 4 and driving shaft 7, which appears as a radial force at bearing 6 and at radial bearing 2. The tangential component of the resultant of the piston forces, on the other hand, exerts a torque on driving plate 4 and driving shaft 7, which acts on the driving motor and also additionally loads bearing 6 and radial bearing 2 in the radial direction.

Figure 2:
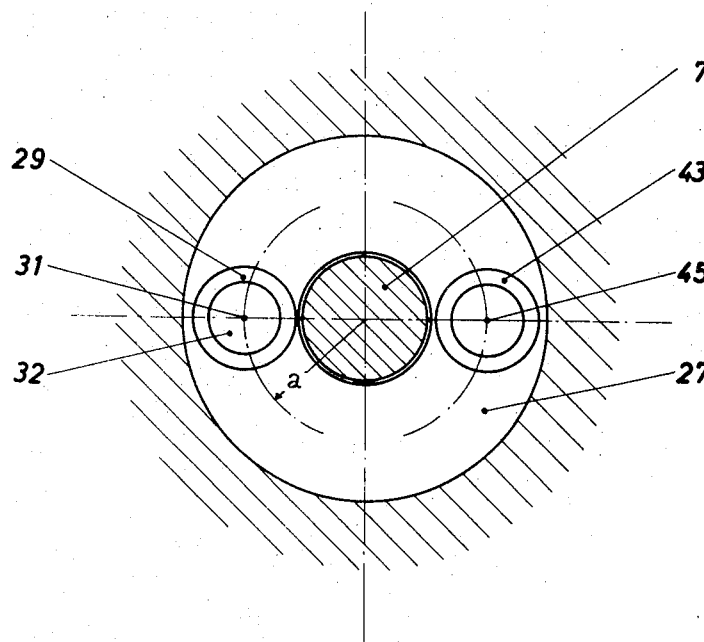
FIG. 2 is a cross section through FIG. 1 taken on the plane A—A of FIG. 1.

The lower section of the machine comprises a bearing housing 27 fixedly mounted in the machine housing 12 and having a cylinder bore 28, which is eccentric relative to the driving shaft axis 3 and which communicates by way of bores 26, 25, 24, 23 with the kidney-shaped pressure port 21. It should be noted that the dead center plane of the machine passes through the axis of the drive shaft and is perpendicular to the paper in FIG. 1. Thus, as seen in FIGS. 1, 2 and 4, the axis of cylinder bore 28 and the vector line of the axial force exerted by piston 29 on disc 33 and bearing 6 lies in a plane which includes the axis 3 of the drive shaft and is perpendicular to the dead center plane. Guided self-aligningly in cylinder bore 28 is a piston 29, a sealing ring 30 separating the pressure loaded bore 28 from housing 27. Piston 29 is pressed against a disc 33, which bears on bearing 6 or driving shaft 7. Since disc 33 rotates with driving shaft 7, piston 29 must be slidable thereon. For lubrication and load relief, piston 29 comprises a circular pressure pocket 32, which communicates by way of a bore 31 with cylinder bore 28. Pressure pocket 32 is dimensioned for maintaining between piston 29 and disc 33 a minimum lubricating gap which remains constant under all working conditions, the self-aligning support of piston 29 contributing to this.

The hydrostatic axial counterbearing according to the present invention is disposed in such a way that the force exerted by it on bearing 6 and on driving shaft 7 is in a plane defined by the axial component of the resultant of the piston forces and the driving shaft axis 3. The eccentricity (a in FIG. 2) of the bearing relative to axis 3 is selected so that driving shaft 7 is subjected to a counter moment which compensates the bending moment exerted by the eccentrically acting axial component of the resultant of the piston forces on driving plate 4 and driving shaft 7, and thus bearing 6 and radial bearing 2 are relieved of radial forces.

The axially acting force of the hydrostatic bearing is chosen by appropriate dimensioning of cylinder bore 28 relative to the axial component of the resultant of the piston forces in such a way that bearing 6 is loaded by the resultant of the combined axial forces and the radial component of the resultant of the piston forces at an angle which is approximately equal to but not greater than the pressure cone angle 5, as determined by the construction, so that the bearing operates in the range of minimum coefficient of friction. An important advantage of the invention is that by applying the previously defined, particularly dimensioned, axially parallel force to the combination bearing 6 by the piston 29, the combination bearing 6, which can be subjected to combined axial and radial loads, has a working life which cannot be increased further even by reduction of the axial load.

In the case of adjustable axial piston machines, whose direction of supply is reversible, each side of the machine has associated with it a hydrostatic axial bearing according to the invention, as shown in FIG. 1. The bearing that is on the pressure side fulfills the function of load relief. Likewise, the low pressure side of a single acting machine can have an additional bearing according to the invention, if an appropriate pressure is available, e.g., in the case of multi-stage machines.

The additional bearings correspond in construction and operation to the hydrostaic axial bearing described hereinbefore. They consist of one or more pressure pistons 48 mounted in self-aligning manner in an eccentric cylinder bore 42 and provided with a sealing ring 44, the pressure pocket 46 thereof communicating by way of a bore 45 with the cylinder bore 42, which is supplied with pressure by way of bores 41, 40, 39, 38 and a kidney-shaped pressure port 37.

The invention can also be used with combinations of bearings which are used in place of combination bearing 6 and/or radial bearing 2 and take over their function, the load relief device according to the invention being designed in view of the resultant pressure cone angle of the combination.

Figure 5:
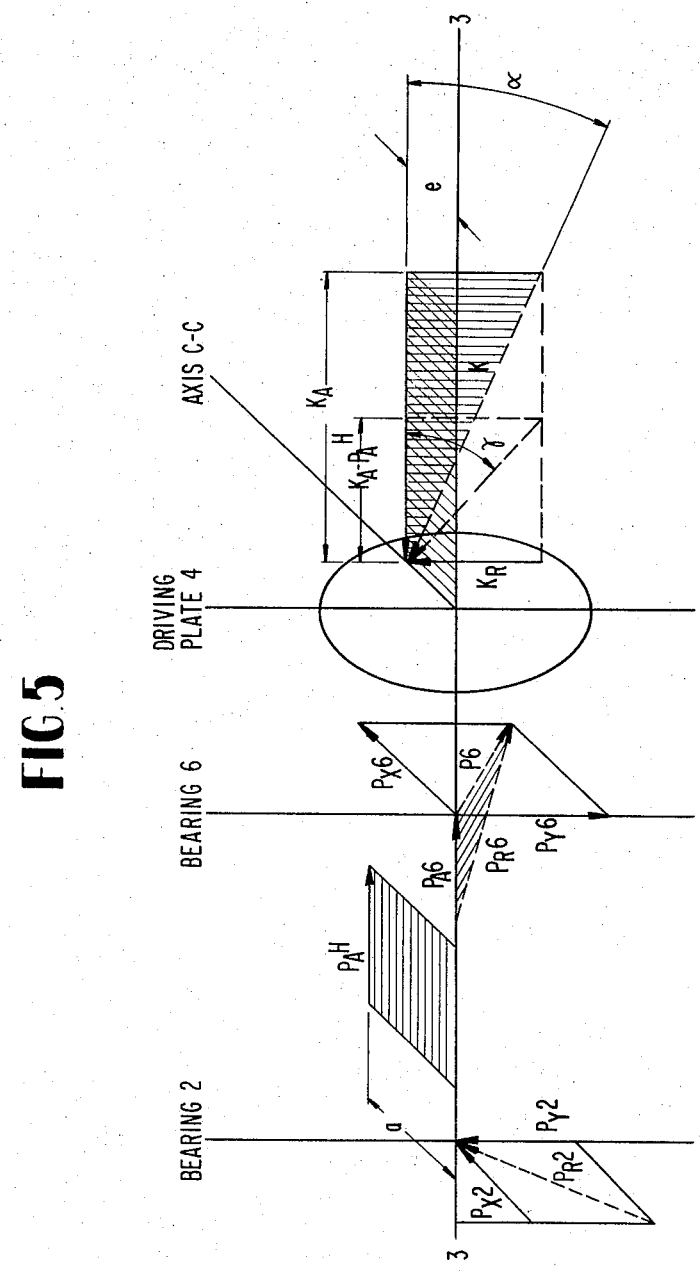
FIG. 5 is a load diagram which illustrates the various applied and reactive loads developed on the axial piston machine according to the invention.

Turning now to the load diagram of FIG. 5, the applied and reactive loads acting on the axial piston machine (pump/motor) as it appears in FIG. 1 are shown with the loads acting at the drive shaft axis 3—3. This diagram will be utilized for the consideration of an example according to which a pump, according to the present invention, but utilizing a tandem set of radial thrust bearings 6 rather than a single radial thrust bearing as shown in FIG. 1, where the design pressure cone angle was 50°, had the following observed parameters: the pressure $p$, which is the pressure within the cylinder bores 19, 35 and within the cylinder bores of the hydrostatic bearings, was 400 bar; the diameter $d_k$, which is the diameter of the working pistons 17, 34 of the pump, was 25 mm; the pivot angle $\alpha$ was a maximum of 25°; and the speed of the drum 18 was 3,200 rpm. In conjunction with these parameters, the diameter ($d_2$), which is the effective diameter of the pistons 29, 43, was designed to be 33.1 mm. Further in conjunction with these parameters, the following relationships are relevant:

$$K = 3.5 \ (\pi/4 \ d_k^2 \cdot p) \quad (1)$$

where, $K$ is the sum of the piston forces applied on the pressure side of the pumps which in this case included seven pistons; $P^A_A = d_2^2 \cdot \pi/4 \cdot p$ (2)

where, $P^H_A$ is the force developed by the pressure in the hydrostatic bearings; and $$\cot \delta = {}^K A - P^H_A / K_R \quad (3)$$

where, $\delta$ is the resultant angle at which the obliquely loadable bearing 6 is actually loaded;
$K_A$ is the axial component of the piston force (k cos $\alpha$); and
$K_R$ is the radial component of the piston force (K sine $\alpha$).

As can be seen for the parameters stated, the resultant angle $\delta$ is calculated to be 46°. By conventional structural analysis methods, the various load components of the bearings 2 and 6 as shown can be calculated knowing the appropriate distances between the two bearings and the distance between the bearing 6 and the load application point at the driving plate 4. The important consideration here is that the angle $\delta$ is less than the design pressure cone angle of 50° (angle 5). With these parameters and an angle $\delta$ of 46°, the service life of the tandem bearing 6 is 1. With these parameters and an angle of 46° the service life of the tandem bearing 6 is 7,000 hr. (1,4000 rpm, 200 bars or 3,000 psi, maximum stroke), while life of the same bearing without load relief is 2,000 hr. as determined by testing.

In contrast if the angle $\delta$ were greater than 50°, its service life would be 2. In contrast if the angle $\delta$ were greater than 50° this kind of bearing would be destroyed in a very short time because the axial contact would not be guaranteed.

In this example, the eccentricities $a$ and $e$ were such that the moments produced by the forces $K_A$ and $P_A^H$ were equal and therefore cancelled each other. It should be noted that even if the eccentricities were such that the moments did not cancel each other, the angle would not be effected because $\delta$ is a function of $K_A - P_A^H$ and $K_R$ as stated above and not the moments. However, the analysis is simplified by cancelling out the moments and it is for this reason that the eccentricities were so selected. Also, it should be noted that although a tandem bearing 6 was used, the results would not be changed if a single radial thrust bearing 6, such as is shown in FIG. 1, were used instead.

It can be seen, therefore, that by appropriately designing the hydrostatic bearing, while taking into consideration the maximum pressure $p$, the maximum angle $\alpha$, and the diameter $d_k$ of the pistons, the load component $K_A$ can be reduced and the angle $\delta$ which is the angle from the plane containing the axes C—C and 3—3 to the resultant of the forces $K_R$ and $K_A - P_A^H$ can be kept within the design pressure cone angle (angle 5) so that the service life of the bearing 6 can be optimized.

What is claimed is:

1. In a method of operating an axial piston machine including a housing, an odd number of parallel spaced pistons, a rotating drive plate against which said pistons act, a rotating shaft extending from said drive plate, said rotating shaft being supported within the housing by a radial bearing assembly and a combined axial and radial thrust angular contact bearing assembly, said last-named bearing assembly having an optimal pressure cone angle designed into it at the time of manufacture, the method including the known simultaneous steps of (a) reciprocating the odd number of parallel spaced pistons by the shaft-driven rotating drive plate arranged obliquely with respect to the axes of said pistons, the reciprocation developing varying combined radial and axial forces which are applied to said drive plate, (b) drawing liquid by said pistons through the suction side of said machine and expelling it through the pressure side thereof, (c) transmitting to one side of the combined axial and radial thrust angular contact bearing assembly adjacent to said drive plate and surrounding said shaft, the varying combined radial and axial forces of said pistons, the improvement comprising the step of applying to the other side of said bearing and at said pressure side of the machine an axial counterforce of such a magnitude that the angle formed by the resultant of the radial and axial forces created by said pistons and said counterforce and exerted on said combined axial and radial thrust angular contact bearing assembly with the axis of said combined axial and radial thrust angular contact bearing assembly is never greater than the optimal pressure cone angle of said bearing assembly.

2. The method as defined in claim 1, including the step of applying a single axially parallel force to one face of a pressure disc surrounding said shaft and being in engagement with said bearing with its outer face, the direction of said last-named single axial force and the axis of said drive shaft forming a plane that is perpendicular to the dead center plane of said axial piston machine.

* * * * *